A. F. MASURY.
MOBILE GUN CARRIAGE.
APPLICATION FILED SEPT. 4, 1918.
1,295,344.
Patented Feb. 25, 1919.
2 SHEETS—SHEET 1.
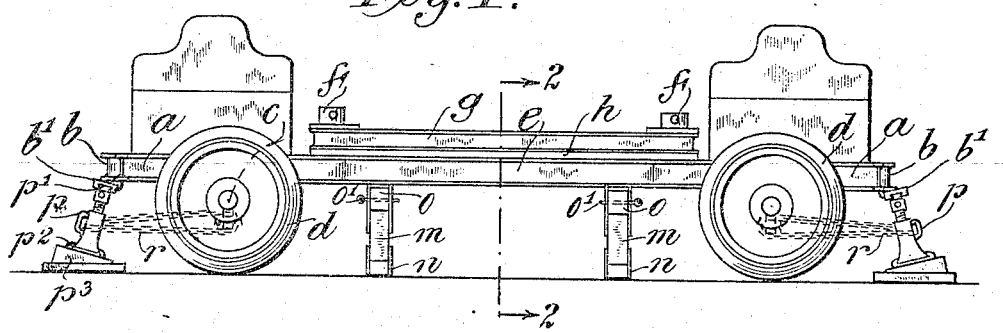
Fig. 1.
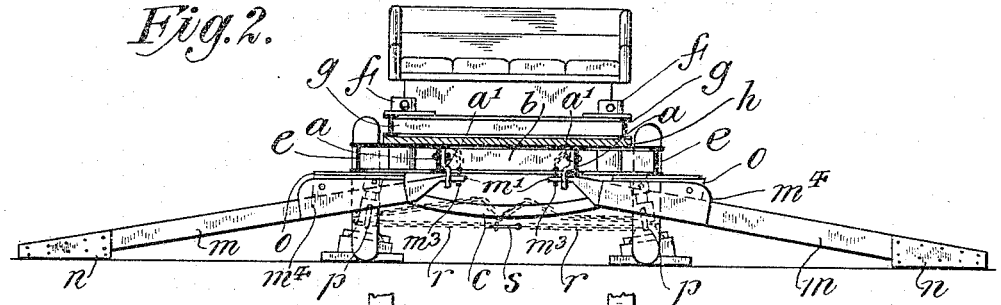
Fig. 2.
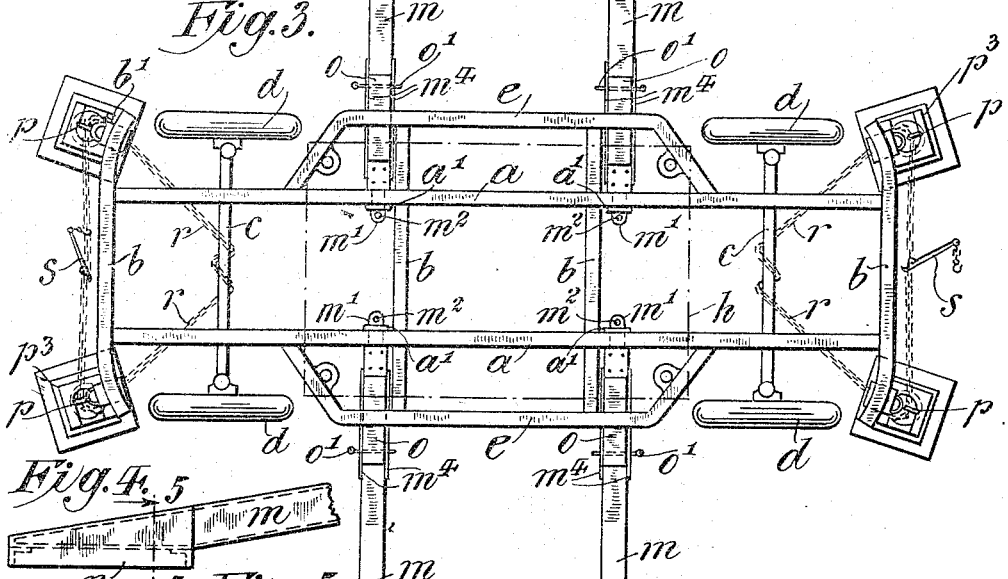
Fig. 3.
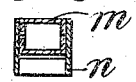
Fig. 4.
Fig. 5.
WITNESS
INVENTOR
Alfred F. Masury
BY
Reading, Greeley & Goodlett
ATTORNEYS A. F. MASURY.
MOBILE GUN CARRIAGE.
APPLICATION FILED SEPT. 4, 1918.
1,295,344.
Patented Feb. 25, 1919.
2 SHEETS—SHEET 2.
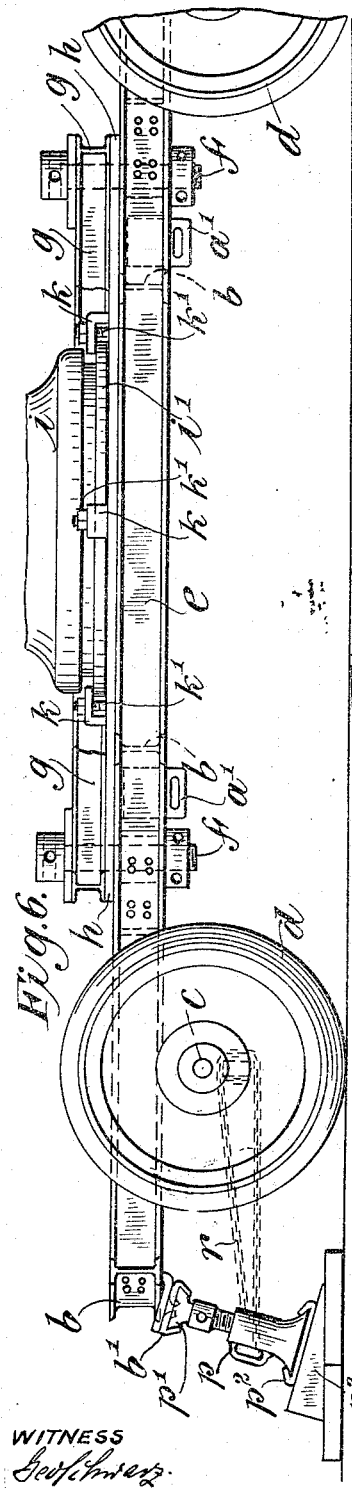
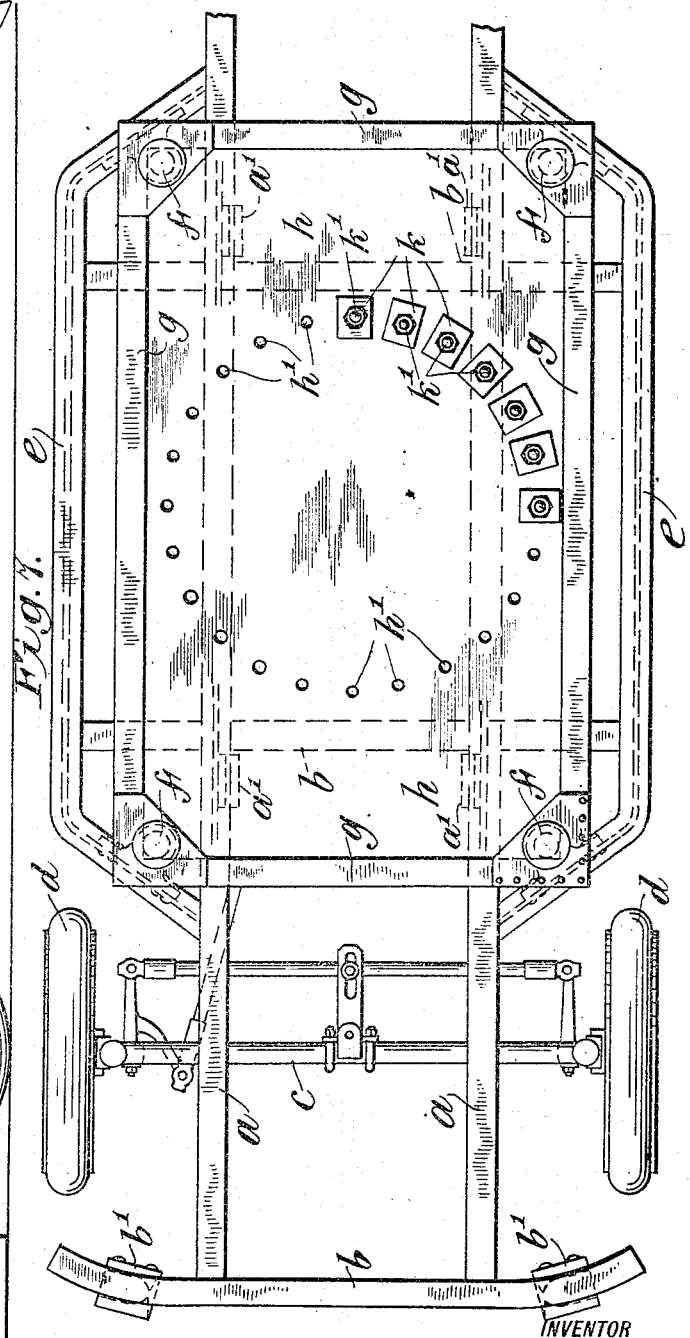

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

MOBILE GUN-CARRIAGE.

1,295,344.     Specification of Letters Patent.     Patented Feb. 25, 1919.

Application filed September 4, 1918. Serial No. 252,545.

To all whom it may concern:

Be it known that I, ALFRED F. MASURY, a citizen of the United States, residing in the borough of Manhattan of the city of New York, in the State of New York, have invented certain new and useful Improvements in Mobile Gun-Carriages, of which the following is a specification, reference being had to the accompanying drawings, forming a part hereof.

This invention relates to trucks or trailers on which light field artillery can be transported quickly from place to place and it has for its object to improve the construction of such trucks or trailers in various particulars with a view to insuring the maximum rigidity of the truck or trailer when it is used as a platform from which the gun is fired and to make it possible to remove the gun and its mount readily and quickly from the truck or trailer so that it can be set on a prepared emplacement. The invention will be more fully explained hereinafter with reference to the accompanying drawings in which it is illustrated, and in which—

Figure 1 is a view in side elevation of the improved truck or trailer ready for use as a gun platform for firing, but with the gun and its mount removed.

Fig. 2 is a view of the same in end elevation, with the trailer body in section.

Fig. 3 is a top view of the same, the braces at one side being broken off to save space.

Figs. 4 and 5 are detail views of the side braces.

Fig. 6 is a partial view similar to Fig. 1, but on a larger scale and with a portion of the gun mount and its securing devices in position.

Fig. 7 is a top view of the parts shown in Fig. 6.

The truck or trailer may be constructed, except as hereinafter indicated, substantially as usual, having a frame with longitudinal members $a$, transverse members $b$ (the latter being extended beyond the longitudinals $a$) and front and rear axles $c$ on which are mounted the wheels $d$. Outer longitudinals $e$ are secured to the inner longitudinals $a$ and to the inner cross members $b$, so that the longitudinals $a$ and $e$ and the cross members $b$ form a unitary, rigid frame. On this main frame may be secured by massive bolts $f$, one at each corner, a supplemental frame which preferably comprises frame members $g$ and a heavy steel plate $h$. The flanged gun mount $i$, shown in part in Fig. 6, may be secured detachably to the plate $h$ by a series of clamps or clips $k$, the clamps or clips overlapping the flange $i'$ of the mount while the bolts $k'$ pass through the clamps or clips and the plate $h$, the holes in the latter being indicated at $h'$ in Fig. 7. On loosening the bolts $k'$ the clips $k$ can be made to release the flange of the mount $i$ so that the gun and its mount can be lifted from the plate $h$ and set on a previously prepared emplacement. Or, if the ground surface is such as to make it more desirable, the gun, the mount $i$, and the frame and plate $g$, $h$, can be released entirely from the frame $a$, $b$, $e$, of the vehicle and placed upon the ground, providing a platform of substantial extent.

If the exigencies of service require that the gun be fired from the truck or trailer as a platform, it is necessary to brace the truck or trailer rigidly and to relieve the wheels as much as possible of the weight and shock. To permit this to be done readily and quickly there are provided braces $m$, preferably two for each side and preferably hollow, as indicated in Figs. 4 and 5, so as to secure both lightness and stiffness. At the outer end each brace $m$ is provided with a foot $n$, adapted to the inclination of the brace, for the purpose of giving to each brace a proper footing on the ground. Each brace $m$ is placed in position by being passed inward under the outer longitudinal $e$ on the corresponding side of the trailer and is then engaged at its inner end with the corresponding inner longitudinal $a$. Such engagement may be effected in any convenient manner. As shown, the brace is provided with a finger $m'$ which is passed through a perforated bracket $a'$, secured to the corresponding longitudinal $a$, the finger $m'$ having a hole $m^2$ to receive a retaining pin $m^3$, as shown particularly in Fig. 2. For the purpose of transferring the weight and shock from the wheels of the trailer or truck to the ground through the braces $m$, wedges $o$ are provided and are driven in between the braces $m$ and the overlying longitudinals $e$. Guide plates $m^4$ may be secured to each brace to maintain the wedges in alinement with the braces $m$ and pins $o'$ may be passed through the wedges and the guide plates for the purpose of retaining the wedges in position.

For the purpose of further supporting the trailer body while it is in use as a gun platform, there is provided for each corner of the trailer body a suitable jack $p$, the head $p'$ of which engages a dove-tailed socket $b'$ which is secured to the corresponding outer cross member $b$ of the frame, the head of the jack being slipped into the socket from one side. At its lower end the jack $p$ engages a dove-tailed socket $p^2$ secured to a broad foot $p^3$ which rests upon the ground. Preferably each jack is inclined somewhat, as clearly shown in Figs. 1 and 6, and the sockets $b'$ and $p^2$ are correspondingly inclined. With the shock of firing the jacks $p$ might jump out of the sockets and for the purpose of preventing this a chain or other flexible retainer $r$ is passed around the axle $c$ and around each jack $p$ and is provided at $s$ with a suitable take-up device, so that, when the parts are in position, the slack can be taken out of the chain $r$ and the jacks $p$ held securely in position.

It will be understood that although the several improvements above described have been designed with particular reference to their conjoint use and coöperation, nevertheless, some of such improvements are capable of advantageous use without the others. It will also be understood that various changes in details of construction and arrangement can be made to suit different conditions of use.

I claim as my invention:

1. In a mobile gun carriage, the combination of a wheeled main frame, a suplemental frame comprising frame members and a rigid plate, means to secure the supplemental frame to the main frame, and releasable clips to secure the gun mount to the supplemental frame.

2. In a mobile gun carriage, the combination of a wheeled main frame having inner and outer longitudinals, side braces adapted to engage the inner longitudinals and means interposed between the outer longitudinals and the braces to transfer the weight of the frame from the wheels to the braces.

3. In a mobile gun carriage, the combination of a wheeled main frame having inner and outer longitudinals, side braces adapted to engage the inner longitudinals and wedges interposed between the outer longitudinals and the braces to transfer the weight of the frame from the wheels to the braces.

4. In a mobile gun carriage, the combination of a wheeled main frame having inner and outer longitudinals, side braces adapted to engage the inner longitudinals, wedges interposed between the outer longitudinals and the braces to transfer the weight of the frame from the wheels to the braces and means to retain the wedges in position.

5. In a mobile gun carriage, the combination of a wheeled main frame, jacks located at the corners of the main frame, dove-tailed sockets secured to the main frame to receive the heads of the jacks and feet with dove-tailed sockets to receive the lower ends of the jacks.

6. In a mobile gun carriage, the combination of a wheeled main frame, jacks located at the corners of the main frame, a flexible retainer passed about a portion of the carriage and the jacks, and means to take up the slack of the retainer to hold the jacks in position.

7. In a mobile gun carriage, the combination of a wheeled main frame, inclined jacks at the corners of the frame, inclined sockets to receive the heads and lower ends of the jacks, a flexible retainer passed about a portion of the carriage and the inclined jacks, and means to take up the slack of the retainer to hold the jacks in position.

This specification signed this 30th day of August A. D. 1918.

ALFRED F. MASURY